United States Patent [19]

Dehne

[11] 4,348,215

[45] Sep. 7, 1982

[54] PARTICULATE SEPARATION DEVICE

[76] Inventor: Manfred F. Dehne, 14350 Chrisman Rd., Houston, Tex. 77039

[21] Appl. No.: 223,801

[22] Filed: Jan. 9, 1981

[51] Int. Cl.³ .................. B01D 45/12; B04C 5/04; B04C 5/185

[52] U.S. Cl. .................................. 55/349; 55/358; 55/429; 55/433; 55/466; 55/435; 209/144

[58] Field of Search .............. 55/319, 344, 346–349, 55/358, 429, 432, 433, 435, 466; 209/143, 144; 210/512.2; 248/55, DIG. 1

[56] References Cited

U.S. PATENT DOCUMENTS

| 1,333,325 | 3/1920 | McGee . | |
|---|---|---|---|
| 2,209,339 | 7/1940 | Knight | 55/344 |
| 2,391,863 | 2/1946 | Bowen . | |
| 2,553,175 | 5/1951 | Davenport et al. . | |
| 2,761,526 | 9/1956 | Kemmetmuller . | |
| 2,917,131 | 9/1959 | Evans . | |
| 2,976,130 | 3/1961 | Hedberg et al. | 55/348 |
| 3,074,218 | 1/1963 | O'Dell et al. | 55/346 |
| 3,365,058 | 1/1968 | Petersen . | |
| 3,503,503 | 3/1970 | Ramond . | |
| 3,541,766 | 11/1970 | Wilson . | |
| 3,631,657 | 1/1972 | Wilson . | |
| 3,638,400 | 2/1972 | Heilmann . | |
| 3,646,595 | 2/1972 | Williams . | |
| 3,720,314 | 3/1973 | Phillippi . | |
| 3,747,306 | 7/1973 | Wikdahl . | |
| 3,813,853 | 6/1974 | Anderson . | |
| 3,853,518 | 12/1974 | Tu et al. . | |
| 3,885,933 | 5/1975 | Putney . | |
| 3,925,045 | 12/1975 | Cheng . | |
| 3,938,960 | 2/1976 | Glasgon et al. | 55/346 |
| 3,951,629 | 4/1976 | Kalen . | |
| 3,960,734 | 6/1976 | Zagorski . | |
| 3,982,902 | 9/1976 | Lortz . | |
| 4,043,775 | 8/1977 | Solomon . | |
| 4,257,788 | 3/1981 | Nassir | 55/435 |

FOREIGN PATENT DOCUMENTS

| 117328 | 8/1943 | Australia | 55/349 |
|---|---|---|---|
| 1004463 | 3/1957 | Fed. Rep. of Germany | 55/349 |
| 306360 | 9/1951 | Switzerland | 55/346 |
| 664001 | 1/1952 | United Kingdom | 55/346 |
| 343701 | 7/1972 | U.S.S.R. | 55/349 |

Primary Examiner—David L. Lacey
Attorney, Agent, or Firm—Carwell & Helmreich

[57] ABSTRACT

A multi-cyclone particulate separation device having a particulate-laden gas structure and a clean gas structure mounted longitudinally within a main housing chamber. A particulate transfer means is mounted at the bottom of the particulate-laden gas structure to transfer particulate from the particulate-laden gas structure outwardly of the main vessel housing prior to separation by the cyclone separators. Mount means for the high-temperature, high-pressure environment are disclosed.

12 Claims, 3 Drawing Figures

PARTICULATE SEPARATION DEVICE

TECHNICAL FIELD

This invention relates to devices for the separation of solid particulates from gases in high-temperature, high-pressure environments.

PRIOR ART

Removal of particulates in a high-temperature, high-pressure environment is needed in many industrial applications such as conventional power generators utilizing solid fuels and catalytic cracking processes for the production of petroleum products. One example of a multiple cyclone separator system is disclosed in the inventor's previously filed application Ser. No. 022,284, filed Mar. 10, 1979, for a Particulate Filtration Device. As disclosed in this patent application, where the flow of particulate-laden gas is at high temperature, high pressure and high volume, the basic particle separation system is a plurality of cyclone separator units. Due to the vigorous conditions of flow including both high temperature and high pressure, the multiple cyclone system of U.S. patent application Ser. No. 022,284 effectively provides support for such separator units in spite of the potentially severe stresses being placed upon the structure.

In U.S. patent application Ser. No. 022,284 and in other such multiple cyclone systems, the basic design of the system includes a particulate-laden gas chamber, a particulate chamber and a clean gas chamber mounted inside a main vessel housing. In the particular design of the particle filtration device of U.S. patent application Ser. No. 022,284, the individual separator units are mounted in the main vessel housing, having inlets in the particulate-laden gas chamber and the appropriate outlets in fluid communication with the particulate and clean gas chambers.

In the arrangement of U.S. patent application Ser. No. 022,284, the particulate suspended in the gas entering into the particulate-laden gas chamber will enter into the individual separator unit inlets, be separated from the gas and exit through the particulate chamber. However, some of the heavier particulate, and surges of large quantitites of particulate functioning as a fluid mass rather than as suspended particles, may tend to bypass the separator unit inlets and settle at the lowermost portion of the particulate-laden gas chamber. Bits of debris will occasionally also enter with the particulate-laden gas and bypass the separator units to settle in the bottom of the particulate-laden gas chamber.

As the amount of particulate and debris in the particulate-laden gas chamber mounts in a multiple cyclone separator system, it becomes necessary to remove the accumulation before it interferes with the operation of the separator units. Removal may be accomplished by entering the particulate-laden gas chamber through an access hatch and removing the built up particulate and debris or by opening a passageway between the particulate-laden gas chamber and the particulate chamber thereby causing built up particulate and debris to exit through the particulate chamber outlet. Either method has the undesirable effect of causing periodic shutdown of the system with the normal problems attending a shutdown and startup cycle.

With respect to the systems allowing for the removal of debris, U.S. Pat. Nos. 2,553,175 and 1,333,325 both illustrate separator systems, which although structurally inadequate for high pressure and temperature operation, provide for periodic removal of accumulations of large particulate and debris. U.S. Pat. Nos. 2,553,175 and 1,333,325 disclose separator systems that are substantially different from the system of U.S. patent application Ser. No. 022,284 in many ways. With respect to the problem of removal of accumulated debris, such debris falls to the bottom of the main vessel of the systems of these patents and temporarily accumulates there as compared to accumulation in the particulate-laden chamber in U.S. patent application Ser. No. 022,284. However, even in the designs disclosed in these patents, the problem of at least temporary accumulation of heavy particles and debris is present, assuming the designs would be theoretically operable, and such accumulations cannot be removed without at least temporarily affecting the entire system.

One solution to this problem is disclosed in the simultaneously filed patent application of the present inventor Ser. No. 223,788 in which a direct particulate outlet means is provided for transporting otherwise accumulated particulate and debris, which falls to the bottom of the particulate-laden gas chamber, from the particulate-laden gas chamber to the main vessel housing particulate outlet without disrupting the necessary pressure differential between the chambers. This invention is directed to the substantial elimination of the same problem for another configuration of a particulate removal system.

SUMMARY OF INVENTION

A particulate filtration device has a main vessel housing forming a main housing chamber, and including a particulate-laden gas inlet, a clean gas outlet and a first and second particulate outlet. A generally cylindrical particulate-laden gas structure is mounted substantially longitudinally within the main housing chamber with an inlet in fluid communication with the main vessel housing particulate-laden gas inlet and an outlet at the other end thereof. A generally cylindrical clean gas structure is mounted substantially longitudinally within the main housing chamber with an outlet in fluid communication with the main vessel housing clean gas outlet. The particulate-laden gas structure and the clean gas structure are mounted by structure mount means in the main vessel housing substantially adjacent to each other longitudinally of the main vessel housing.

A separator assembly including a plurality of individual separator units each with an inlet in fluid communication with the particulate-laden gas structure, a clean gas outlet in fluid communication with the clean gas structure and a particulate outlet in fluid communication with the main housing chamber is mounted in the main housing chamber in a vertically stacked arrangement. The particulate-laden gas structure and the clean gas structure are provided with means for mounting the separator units in longitudinal rows. A particulate transfer means mounted within the main housing chamber extends between the outlet of the particulate-laden gas structure and the second particulate outlet of the main vessel housing for transferring outwardly of said main vessel housing particulate and debris separated from the particulate-laden gas prior to entry of the gas into the separator units.

DESCRIPTION OF THE PREFERRED EMBODIMENT

Figure 1:
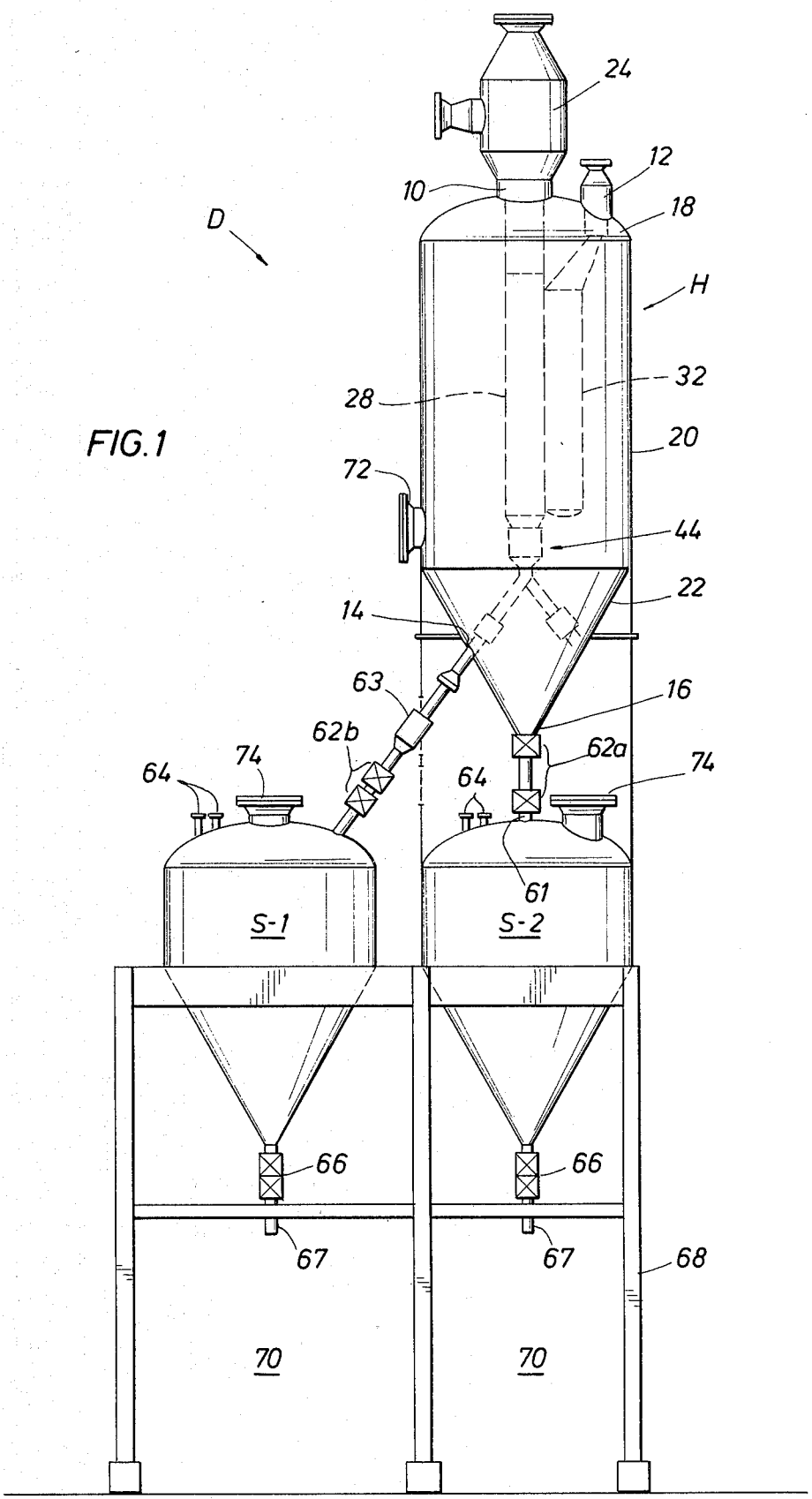
FIG. 1 is a side view of the particulate filtration system of the present invention.
Figure 2:
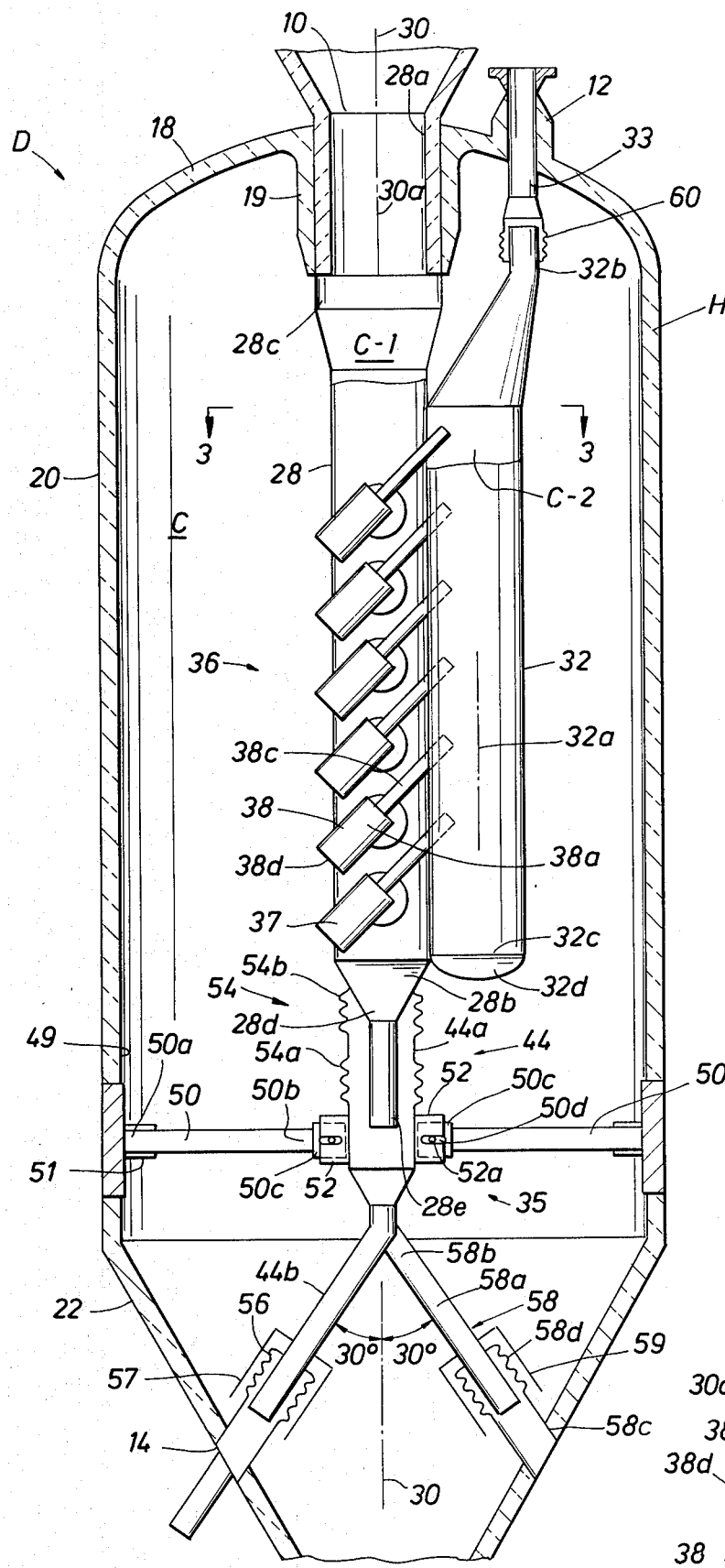
FIG. 2 is a view in partial cross section of the main vessel housing of the present invention.

Referring to the drawings, FIG. 1 shows a side view of the particulate filtration system D of the present invention including the generally cylindrical main vessel housing H which forms a main housing chamber C (shown in FIG. 2). The main vessel housing H has a particulate-laden gas inlet 10 adapted to receive particulate-laden gas, a clean gas outlet 12 to transfer cleaned gas outwardly of the main vessel housing H, a first particulate outlet 14 and a second particulate outlet 16 both to transfer particulate outwardly of the main vessel housing H. The first particulate outlet 14 is connected through piping to be discussed in detail later to a first discharge vessel or bin S-1 and the second particulate outlet 16 is connected through piping to discharge vessel or bin S-2.

As seen in FIG. 2, the main housing H is formed of a top dome-shaped portion 18, a cylindrical mid-portion 20 and an inverted frustro-conical shaped bottom portion 22. The main vessel inlet 10 is formed in part by a depending annular wall section 19 that extends into the interior of housing H. The main housing H and the other structures of this invention are constructed of materials suitable for the high-temperature, high-pressure environment.

The particulate-laden gas inlet 10 is in fluid communication with a generally cylindrical particulate-laden gas receiving structure or housing member 28 mounted substantially longitudinally in relation to axis 30 of the main housing chamber C. The particulate-laden gas structure 28 has an inlet 28a at a first or top end in fluid communication with main vessel housing particulate-laden gas inlet 10 and a particulate outlet 28b at the other or lower end. To provide necessary insulation for the particulate filtration system D, the main housing H, wall section 19 and portion 28c of structure 28 are constructed with a thick insulation layer on their interior surface. Because the temperature differentials within the chamber C are less than the differential with the exterior, the interior components do not need an insulation layer. The upper portion of the particulate-laden gas structure 28 is welded to a generally cylindrical entry vessel 24. The particulate-laden gas structure forms a particulate-laden gas chamber C-1 therein.

A generally cylindrical clean gas structure 32 is also mounted within the main housing chamber C from top portion 18 with its longitudinal axis 32a substantially parallel to the main housing chamber axis 30. The clean gas structure 32 has an outlet 32b at its upper end in fluid communication with the clean gas outlet 12 through a piping member 33. The bottom end 32c of the clean gas structure 32 is closed by a cap 32d. The particulate-laden gas structure 28 and clean gas structure 32 are mounted substantially adjacent to each other longitudinally of the main vessel housing H by mount means generally designated as 34 and 35, to be described in detail hereinafter.

Separation of particulate from particulate-laden gas is performed by the separator assembly 36 which includes a plurality of individual cyclone separator units 38 which are of conventional design or the unique design of U.S. Pat. No. 3,802,570. The separator units 38 are mounted in a vertically stacked arrangement in longitudinal rows by the particulate-laden gas structure 28 and the clean gas structure 32.

Figure 3:
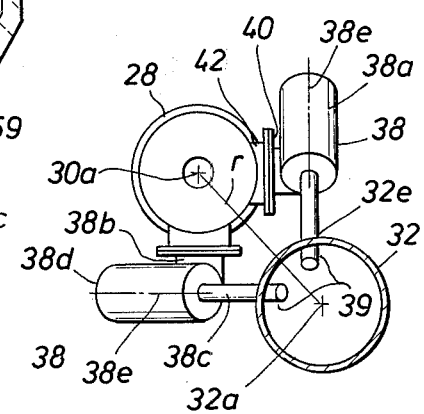
FIG. 3 is a cross-sectional view of the clean gas chamber and the particulate-laden gas chamber taken along line 3—3 of FIG. 2.

As shown in FIG. 3, each separator unit 38 has a main body 38a, a particulate-laden gas inlet 38b, a clean gas outlet 38c and a particulate outlet 38d. Particulate-laden gas entering the separator unit main body 38a through the particulate-laden gas inlet 38b is swirled towards the particulate outlet 38d which separates the particulate which exits through the particulate outlet 38d. The cleaned gas exits through the clean gas outlet 38c. The separator units 38 are mounted by their particulate-laden gas inlets 38b through flange 40 to a supporting flange 42 mounted in the wall of particulate-laden gas structure 28 about an opening which provides fluid communication between the particulate-laden gas structure 28 and the separator units 38. The supporting flange 42 recesses the separator inlet 38b from the particulate-laden gas chamber C-1 thereby decreasing the average size of particulate that enters the separators 38 and increasing the efficiency of the separators 38. This mounting also allows easy replacement of separators as needed because the connection will be made between flanges 40 and 42. The separator unit clean gas outlets 38c are tubular in structure and extend through openings 32e in the clean gas structure 32, wherein clean gas chamber C-2 is formed. In the embodiment illustrated, the separator units main body 38a are placed at an angle relative to horizontal so that the clean gas outlets 38c are higher than the particulate outlets 38d. The main body 38a is mounted at substantially a tangent to the particulate-laden gas structure 28 so that on a horizontal plane, as seen in FIG. 3, a pair 39 of separator units 38 may be mounted 90° apart on the circumference of the particulate-laden gas structure 28 and their outlets 38c then enter at substantially the same level into the clean gas structure 32 at 90° angles with respect to each other and the longitudinal axis 38e of the bodies 38a also intersect at a right angle. As seen in FIG. 3, the longitudinal axis 30a of the particulate-laden gas structure 28 is coincidental with the vessel axis 30. In other embodiments, the axis 30a of particulate-laden gas structure 28 may be mounted substantially parallel but not coincidental with axis 30. The longitudinal axis 32a of clean gas structure 32 is perpendicular to an extended radius r of axis 30a. As seen in FIG. 2, the separator units 38 are vertically stacked to form longitudinal rows of separator units. As shown in FIG. 3, there are two such longitudinal rows.

A particulate transfer means 44 is mounted within the main housing chamber C and extends between the particulate-laden gas outlet 28b of the particulate-laden gas structure 28 and the first particulate outlet 14 of the main vessel housing H to transfer outwardly of the main vessel housing H particulate and debris separated from the particulate-laden gas prior to entry of the gas into the separator units 38.

The particulate transfer means 44 has a vertical barrel-shaped body 44a which fits over the lower end of the particulate-laden gas structure outlet 28b and an angled conduit portion 44b leading to the first particulate outlet 14 at an angle from axis 30. In the preferred embodiment, the outlet 28b is an inverted frustro-conical portion, with its apex 28d joined to a tube 28e with a diameter smaller than the diameter of the particulate-laden gas structure 28 extending downwardly into the particulate transfer means barrel-shaped portion 44a. Because the pressure at main vessel housing first particulate outlet will be substantially the same as the pressure in the particulate-laden gas structure 28, the outlet 28b could enter directly into particulate transfer means 44.

Operation

In operation, the particulate-laden gas will enter through entry vessel 24 into the particulate-laden gas inlet 10. A pressure differential will exist between the particulate-laden gas structure chamber C-1 and the main housing chamber C which will cause the major portion of the particulate-laden gas to enter into one of the separator units particulate-laden gas inlets 38b and be separated into particulate which will enter into the main housing chamber C and cleaned gas which will enter into the cleaned gas structure chamber C-2 and exit through the clean gas outlet 12. As will be explained in greater detail below, the particulate in the main housing chamber C will exit through the second particulate outlet 16 into the second discharge bin S-2. Particulate or debris which for any reason does not enter the separator units 38 to be separated will be moved to the bottom of the particulate-laden gas structure chamber C-1 and exit through the structure outlet 28b. Such particulate will enter into the particulate means 44 where it will be transported to the first particulate outlet 14 and into a first discharge vessel S-1.

Mounting

The relative forces operating on various elements of the particulate filtration device D are significantly different between the steady-state operational temperature and pressure and the ambient conditions so that destructive internal forces are caused by the flow of high pressure, high temperature particulate-laden gas into the system D.

The particulate-laden gas structure 28 is mounted at the center of the housing H and substantially suspended from top housing portion 18. The generally cylindrical structure 28 includes upper, insulated portion 28c which is welded or otherwise mounted within the depending vessel collar 19. The particulate-laden gas structure is connected to clean gas piping member 33 which extends through vessel outlet 12 and through expansion joint 60 to upper clean gas structure outlet 32b. Additionally, the clean gas structure 32 is supported through connection of the rows of separator units 38 to both the particulate-laden gas structure 28 and clean gas structure 32 as illustrated in FIG. 3. The suspension of the structures 28 and 32 as described herein allows for substantial expansion and contraction of the structures 28 and 32 and for horizontal or radial movement therebetween due to expansion and contraction of the separator units 38.

The particulate transfer support means 35 is designed to compensate for relative expansion and contraction due to temperature and pressure of structure 28 and the particulate transfer means 44. The particulate transfer support means 35 includes a plurality of horizontal support members 50 radially mounted in a spoke-like relationship to compensate for horizontal dislocation of the particulate transfer body 44a. Each of the members 50 is identical except for their positions and thus have the following elements. Each member 50 has a first end 50a which is rigidly attached to the interior wall 49 of main vessel housing H adjacent the bottom of middle portion 20 by an internal collar 51 attached to interior wall 49 of housing H. A second end 50b of each horizontal support member 50 is slidably mounted to the particulate transfer body 44a. The horizontal support members 50 are equally circumferentially spaced on particulate transfer body 44a so that the forces are balanced. A collar 50c is mounted onto the second, inner end 50b of member 50. Both the collar 50c and the second, inner end 50b of member 50 contain an elongated opening 50d therein. The collar 50c and the second, inner end 50b are placed within a cylinder 52 mounted to the particulate transfer body 44a. Pins 52a are mounted in the collar 50c and extend through member openings 50d to allow the particulate transfer body 44a to move horizontally in a slidable manner with respect to horizontal support members 50. The horizontal support means 50 could, if desired, be attached rigidly to particulate transfer means 44 and slidably mounted to main vessel housing H.

The particulate transfer support means 35 further includes vertical expansion means 54 which is mounted on the particulate transfer means 44 between the separator assembly 36 and the horizontal support members 50. As shown in FIG. 2, the vertical expansion means 54 is two expansion joints 54a and 54b mounted in the body 44a of particulate transfer means 44.

If not compensated for, the expansion of the angled conduit 44b of particulate transfer means 44 would cause unbalanced forces. An expansion joint 56 is mounted with the particulate transfer means conduit 44b between the first particulate outlet 14 and the horizontal support members 50 to allow non-destructive linear expansion and contraction of the particulate transfer body 44a and conduit 44b. To further compensate for this expansion of conduit 44b or displacement caused by vertical movement of body 44a, angled compensation means 58, comprising a pipe structure 58a with a first end 58b, a second end 58c and an expansion joint 58d, is mounted adjacent its first end 58b to the particulate transfer means conduit 44b below and adjacent the horizontal support members 50 at an angle equal to the angle of angled conduit 44b with respect to longitudinal axis 30a of particulate-laden gas structure 28. Angled compensation conduit 58a is mounted at end 58c to the main vessel housing H diametrically opposite the first particulate outlet 14. In an embodiment in which axis 30 and axis 30a are parallel but not coincidental, conduit end 58c will be mounted to main vessel housing H at the symmetrical point using the plane containing axis 30 and axis 30a as the plane of symmetry. Therefore, conduit 44b and compensation conduit 58a will be of equal length and be mounted with housing H at an equal angle. Because angled compensation member 58a is constructed identically to angled conduit portion 44b and mounted oppositely thereto, it provides a counter support force of equal amount to fully support the movement of body 44a. Cylinders 57 and 59 are mounted about expansion joints 56 and 58d, respectively, to provide cover.

The vertical expansion of the clean gas structure 32 is compensated for by expansion means 60 which allows vertical dislocation of the clean gas chamber and is mounted adjacent the main vessel housing clean gas outlet 12. In the preferred embodiment, it will be an expansion joint mounted just below the outlet 12.

Discharge

As shown in FIG. 1 and mentioned above, the particulate from the main housing chamber C separated by separator units 38 will exit through second particulate outlet 16 and a conduit 61 into second discharge bin S-2 and the particulate from the particulate transfer means 44 will exit through first particulate outlet 14 and a conduit 63 into the first particulate discharge bin S-1. The flow to these bins may be interrupted by the sets of valves 62a mounted in conduit 61 and 62b mounted in conduit 63, respectively. Valve sets 62a and 62b are used when it is necessary to remove particulate and debris from the bins after a period of collecting. One advantage of this design is that the particulate will collect in the discharge bins S-1 and S-2 remote from the main vessel housing H and its environment. Therefore, the temperature of the particulate will be reduced in the bins S-1 and S-2 so that it may be handled easier and with less danger. When it is desired to remove particulate from the discharge bins S-1 and S-2, the sets of valves 62a and 62b are closed. In the preferred embodiment, sets 62a and 62b of two valves are used because of the high pressure differential between the main vessel housing H and the ambient conditions. After the double valves 62a and 62b are closed to interrupt flow between the main vessel housing H and the discharge bins S-1 and S-2, pressure relief valves 64 are opened on each discharge bin to bring the bins to ambient pressure. The bins have outlet valves 66 which are then open to empty the discharge bins S-1 and S-2 through outlet nozzles 67. After the bins are emptied, the outlet valves 66 and pressure valves 64 are closed and the valves 62a and 62b are opened so that particulate may flow again into the bins S-1 and S-2. There is sufficient space in the bottom portion 22 of the main vessel housing H and in the conduit 63 between the valves 62a and 62b and the lowest separator unit 37 that while the valves 62a and 62b are closed to discharge bins S-1 and S-2, the particulate will not mount high enough to interrupt the operation of the system. Therefore, there is no need for any shutdown of flow through the separator units 38 during removal of particulate from bins S-2 and S-2.

In the preferred embodiment, the main vessel housing H will be mounted by any means well known in the art at a height sufficient to allow the discharge bins S-1 and S-2 to be mounted beneath it by a support structure 68 of any well known design at a height which creates a space 70 for trucks to enter beneath the outlet nozzles 67 to collect separated particulate. Manhole 72 is located along the mid-portion 20 of main vessel housing H to allow entry for repair and other purposes as are discharge bin manholes 74.

The foregoing disclosure and description of the invention are illustrative and explanatory thereof and various changes in the size, shape and materials as well as the details of the illustrated construction may be made without departing from the spirit of the invention.

I claim:

1. In a particulate separating device, including a main vessel housing forming a particulate chamber, a particulate-laden housing mounted within said main vessel housing and forming a particulate-laden gas chamber said main vessel having a first particulate outlet, a clean gas housing mounted within said main vessel housing adjacent said particulate-laden gas housing and forming a clean gas chamber, a particulate-laden gas inlet in fluid communication with said particulate-laden gas chamber, a clean gas outlet in fluid communication with said clean gas chamber, a plurality of cyclone separator units each mounted to said particulate-laden gas chamber and said clean gas chamber, and said main vessel having a second particulate outlet in fluid communication with said particulate chamber, the improvement comprising:
   particulate transfer means being connected to both said particulate-laden gas chamber and said first particulate outlet;
   said particulate transfer means including a particulate transfer body having a substantially vertical axis;
   said first particulate outlet being horizontally displaced from said particulate transfer body axis;
   said particulate transfer means further including an angled conduit portion mounted between said particulate transfer body and said first particulate outlet; and
   angled compensation means mounted between said particulate transfer body and a location on said main vessel housing diametrically opposite said first particulate outlet for reducing thermal expansion forces exerted on said particulate transfer body by said angled conduit portion.

2. Apparatus as defined in claim 1, comprising:
   a plurality of substantially horizontal support members each interconnected between said main vessel housing and a lower portion of said particulate transfer body for supporting said particulate transfer body; and
   each of said horizontal support members including a slidable end portion for reducing thermal expansion forces exerted on said particulate transfer body.

3. Apparatus as defined in claim 2, each of said horizontal support members being positioned diametrically opposite another of said support members.

4. Apparatus as defined in claim 2, further comprising:
   a vertical expansion member mounted between said particulate-laden gas housing and said lower portion of said particulate transfer body; and
   another vertical expansion member mounted between an upper portion of said clean gas housing and said clean gas outlet.

5. Apparatus as defined in claim 1, further comprising:
   a first expansion member mounted to said angled conduit portion;
   said angled compensation means including a pipe member; and
   a second expansion member mounted to said pipe member.

6. Apparatus of claim 1, further comprising:
   first and second discharge vessels each located remote from said main vessel housing;
   said first particulate outlet connected to said first discharge vessel by first conduit means;
   said second particulate outlet connected to said second discharge vessel by second conduit means;
   a first and second valve means mounted to said first conduit means for controlling flow of particulate and gas to said first discharge vessel; and
   a third and fourth valve means mounted to said second conduit means for controlling flow of particulate and gas to said second discharge vessel.

7. Apparatus as defined in claim 1, further comprising:

said main vessel housing having a generally cylindrical configuration with a substantially vertical main housing axis aligned with said particulate transfer body axis; and said particulate-laden gas housing having a generally cylindrical configuration with a substantially vertical particulate-laden gas housing axis aligned with said particulate transfer body axis.

8. Apparatus as defined in claim 7, further comprising:

said clean gas housing having a generally cylindrical configuration with a substantially vertical clean gas axis parallel to and non-aligned with said particulate-laden gas housing axis.

9. Apparatus as defined in claim 1, further comprising:

said main vessel housing having a generally cylindrical configuration with a substantially vertical main housing axis aligned with said particulate transfer body axis;

said particulate-laden gas housing having a generally cylindrical configuration with a substantially vertical particulate-laden gas housing axis parallel to and non-aligned with said main housing axis; and said angled compensation means is mounted to said main vessel housing at a location symmetrically opposite said first particulate outlet within a plane of symmetry containing said main housing axis and said particulate-laden gas housing axis.

10. Apparatus as defined in claim 1, said angled compensation means including a pipe member mounted at an angle relative to said particulate transfer body axis substantially equal to the angle of said angled conduit portion.

11. Apparatus as defined in claim 1, wherein said particulate-laden gas housing has a plurality of openings each for establishing fluid communication with one of said plurality of cyclone separator units, and each of said openings has a support flange connected to a corresponding flange on the inlet conduit of a respective separator unit so as to recess each separator unit from said particulate-laden gas chamber.

12. Apparatus as defined in claim 11, wherein said supporting flanges are positioned on said particulate-laden gas housing in one of two longitudinal rows spaced substantially 90° from the other row relative to said particulate-laden gas housing.

* * * * *